(12) United States Patent
Parkin

(10) Patent No.: US 7,947,963 B2
(45) Date of Patent: May 24, 2011

(54) METHOD AND APPARATUS FOR MEASURING RADIOACTIVITY

(75) Inventor: James Michael Parkin, Poole (GB)

(73) Assignee: Laboratory Impex Systems Ltd., Poole (GB)

(*) Notice: Subject to any disclaimer, the term of this patent is extended or adjusted under 35 U.S.C. 154(b) by 48 days.

(21) Appl. No.: 12/512,085

(22) Filed: Jul. 30, 2009

(65) Prior Publication Data

US 2010/0059685 A1   Mar. 11, 2010

(30) Foreign Application Priority Data

Aug. 1, 2008   (GB) .................................. 0814115.2
Oct. 30, 2008   (GB) .................................. 0819926.7

(51) Int. Cl.
*G01T 1/36* (2006.01)
(52) U.S. Cl. ....................................................... 250/395
(58) Field of Classification Search ............... 250/336.1, 250/362, 370.02, 395; 378/48, 98
See application file for complete search history.

(56) References Cited

U.S. PATENT DOCUMENTS 4,362,935 A * 12/1982 Clark, III ..................... 378/48
6,822,235 B2   11/2004 Ryden

FOREIGN PATENT DOCUMENTS

| GB | 2445578 A | 7/2008 |
| WO | 2006036425 A3 | 4/2006 |
| WO | 2009001710 | 12/2008 |
| WO | 2009001711 | 12/2008 |

OTHER PUBLICATIONS

Search report from the UK Patent Office dated Apr. 28, 2009 issued in priority application No. GB0819926.7.

* cited by examiner

*Primary Examiner* — David P Porta
*Assistant Examiner* — Marcus H Taningco
(74) *Attorney, Agent, or Firm* — Rissman, Hendricks & Oliverio, LLP

(57) ABSTRACT

A method of measuring radioactivity includes determining a fitted spectral distribution region for recorded counts data of at least a first activity peak determining characteristic data of the fitted spectral distribution region, and using the characteristic data to determine a spectral distribution region of a second activity peak.

15 Claims, 5 Drawing Sheets

METHOD AND APPARATUS FOR MEASURING RADIOACTIVITY

CROSS-REFERENCES TO RELATED APPLICATIONS

This application claims the priority of UK Patent Application Nos.: GB 0814115.2 filed 1 Aug. 2008 and GB 0819926.7 filed 30 Oct. 2008, pursuant to 35 U.S.C. 119(a)-(d), the contents of which are incorporated herein by reference in their entirety as if fully set forth herein.

TECHNICAL FIELD

The present invention relates generally to measuring radioactivity.

BACKGROUND

In radioactivity measurement it is often required to determine the activity resulting from transuranic elements, namely those elements with an atomic number greater than ninety-two. It is known to use curve fitting methodology to determine transuranic activity. However, very often a transuranic activity peak will be very close to another activity peak. This poses a problem for the curve fitting methodology which cannot easily handle two peaks. We therefore seek to provide an improved method and apparatus for measuring transuranic radioactivity.

SUMMARY

According to a first aspect of the invention, there is provided a method of measuring radioactivity comprising determining a fitted spectral distribution region for recorded counts data of at least a first activity peak, determining characteristic data of the fitted spectral distribution region, and using the characteristic data to determine a spectral distribution region of a second activity peak.

According to a second aspect of the invention, there is provided a radioactivity measurement apparatus comprising a data processor and a radioactivity detector, the data processor configured to determine a fitted spectral distribution region for recorded counts data of at least a first activity peak, determining characteristic data of the fitted spectral distribution, and using the characteristic data to determine a spectral distribution region of a second activity peak.

According to a third aspect of the invention, there are provided machine-readable instructions for a data processor of a radioactivity measurement apparatus, the instructions comprising instructions to cause the processor to determine a fitted spectral distribution region for recorded counts of at least a first activity peak, instruction to cause the processor to determine characteristic data of the fitted spectral distribution region, and instructions to cause the processor to use the characteristic data to determine a spectral distribution region of a second activity peak.

The instructions may be provided on a data carrier, or may be provided in form of a signal.

BRIEF DESCRIPTION OF THE DRAWINGS

One embodiment of the invention will now be described, by way of example only, with reference to the accompanying drawings in which.

DETAILED DESCRIPTION

Figure 1:
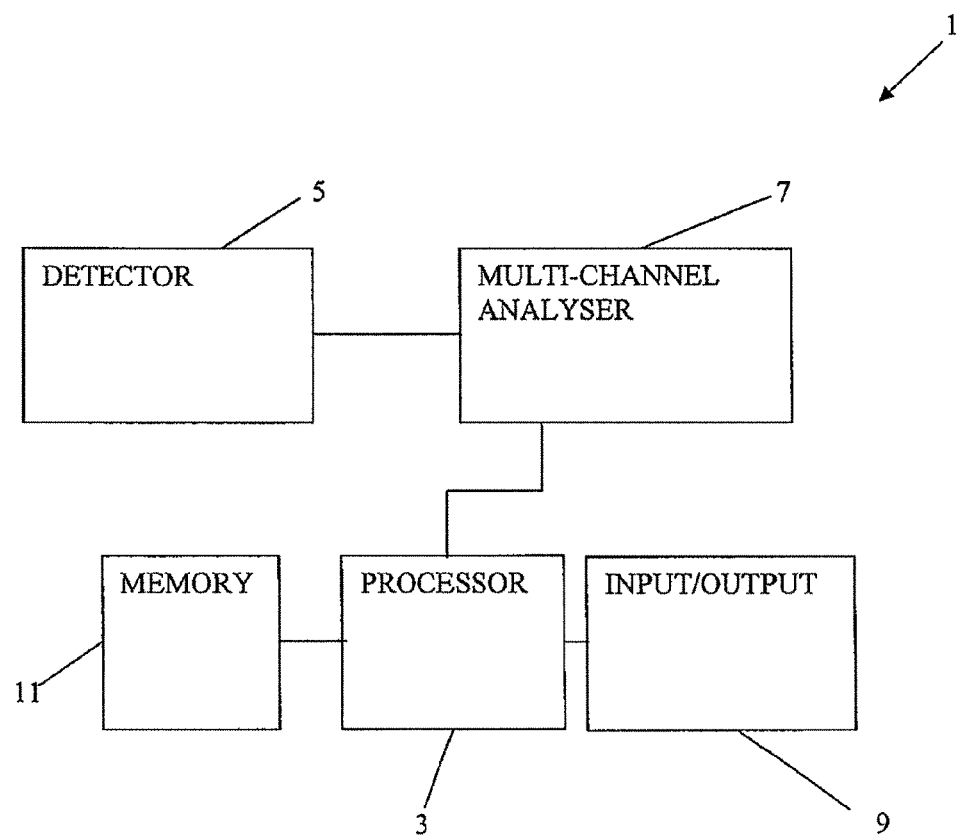
FIG. 1 shows a radioactivity measuring apparatus.

With reference to FIG. 1 there is shown a radioactivity measuring apparatus 1 comprising a radiation detector 5, a multi-channel analyser (MCA) 7, a data processor 3, a memory 11 and a user input/output arrangement 9. As will be described below in more detail, the memory 11 includes instructions to control the processor 3 to determine a counts value in a spectral region of interest so that a more accurate value of activity of transuranic materials can be determined.

Figure 2:
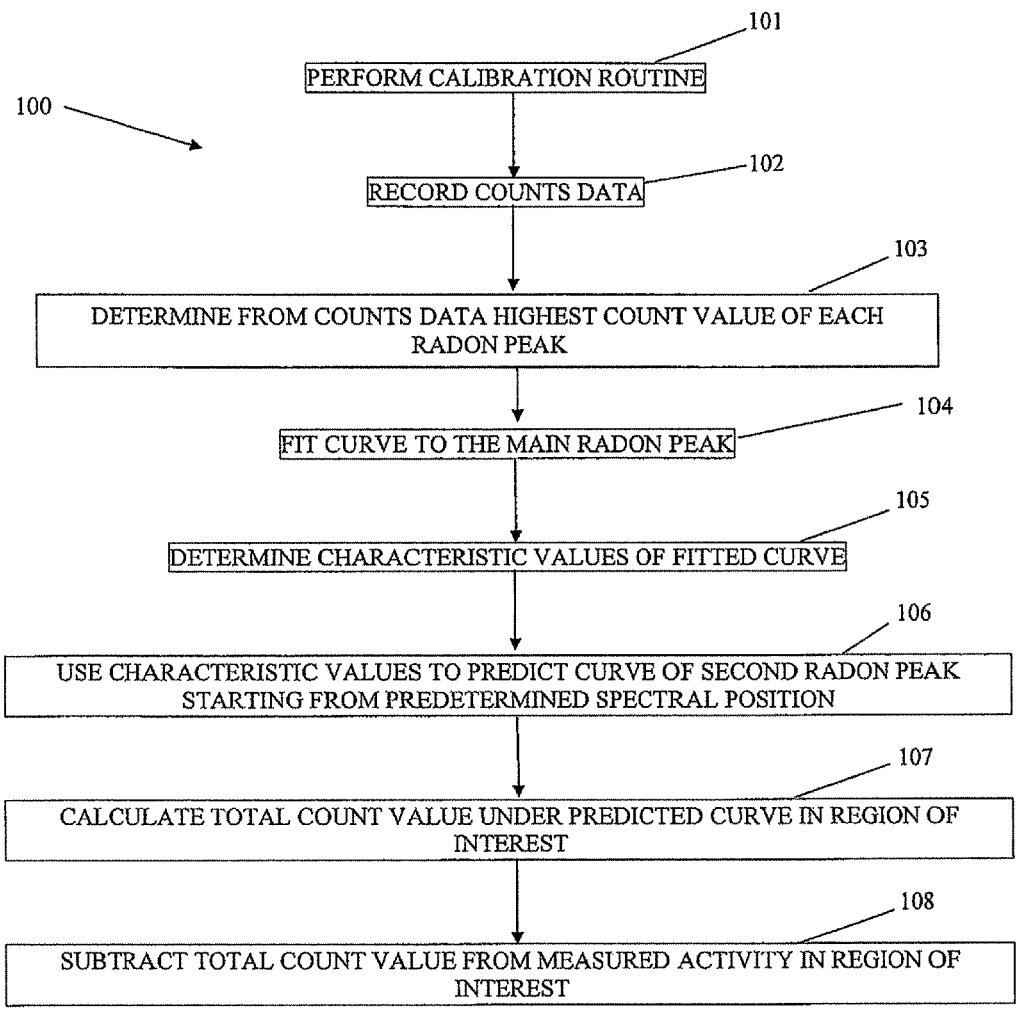
FIG. 2 shows a flow diagram.

A calibration routine, as shown at step 101 in FIG. 2, is first performed. During this routine, typically lasting several hours, radiation detected by the detector 5 is classified into respective channels, each channel relating to a particular detected energy level. At step 102 the recorded data is stored in the memory 11.

Figure 3:
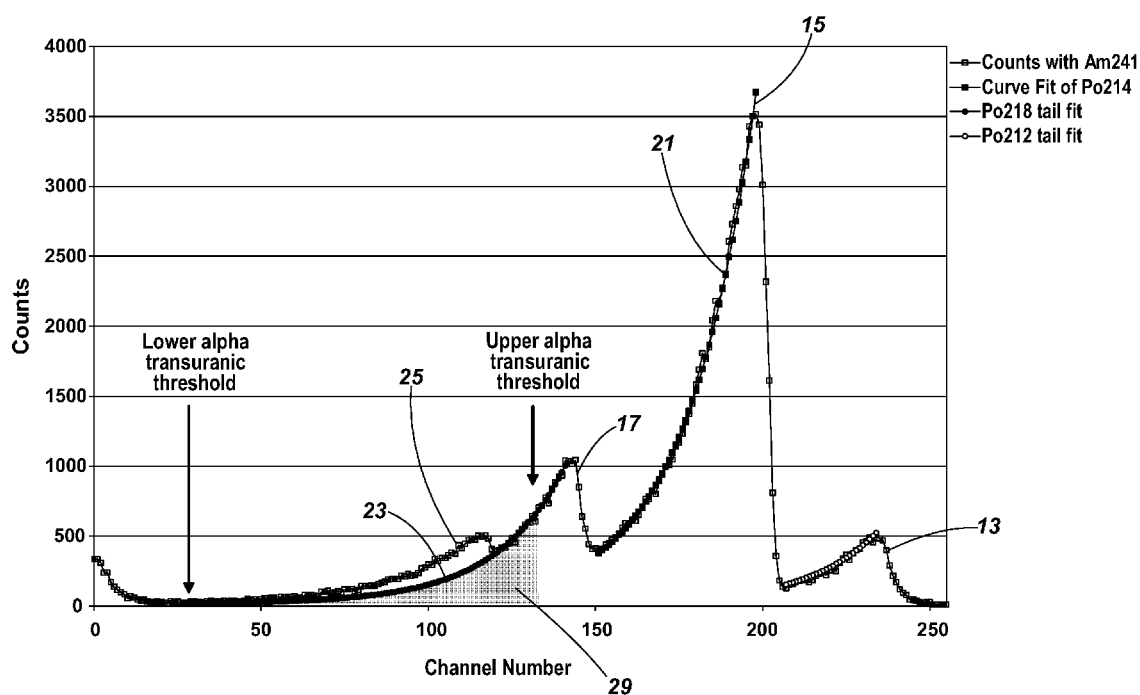
FIG. 3 shows a radioactivity energy spectrum.

With reference to FIG. 3 the data recorded during the calibration routine is shown by the dark squares, described in the key as 'Counts with Am241'. As can be seen, four activity peaks 13, 15, 17 and 25 are discernible. The peaks 13, 15 and 17 relate to Polonium (Po) activity which exists naturally in the form of Radon gas and specifically to $^{212}$Po, $^{214}$Po and $^{218}$Po respectively. The channel positions of the three radon peaks are known to the processor 3 and at step 103 the processor is configured to store in the memory 11 a data marker corresponding to the uppermost count value of each peak. Using a suitable curve-fit methodology, such as Marquardt-Levenberg non-linear regression, at step 104 a curve of the type $y=ae^{bx}$, where y is the count value, x is the energy channel, and a and b are coefficients, can be determined. From the marker for the peak 15 the curve-fitting methodology calculates a curve of the type $ae^{bx}$ which best fits the recorded counts data of the peak 15 and is representative of a spectral distribution region of the peak 15. This fitted curve is shown in FIG. 3 at 21 by the grey squares and referred to in the key as 'curve fit of Po214'. From obtaining this best-fit curve at step 105 the processor 3 can then extract the values a and b for the fitted distribution curve. These values may be termed the characteristic values of the fitted curve. In the example shown a=0.248 and b=0.0483. The processor 3 is then configured at step 106 to determine a distribution curve in respect of Po218. The processor 3 first normalises, or scales, the value of a to the uppermost count value of the Po218 peak. In the example shown this uppermost count value is 1036 which occurs at channel number 142. So, by rearranging the equation $y=ae^{bx}$, and assuming the same value of b as determined for Po214, results in a normalised value of a of 1.088. The processor 3 can thus determine the distribution curve for Po218 by extrapolating the equation $y=ae^{bx}+c$ from the uppermost count value of Po218. It is to be noted that the value of c is proportional to the uppermost count value of the Po214 peak. Typically c would be 0.5% of the uppermost count value of the Po214 peak. The resulting distribution curve is shown at 23, and referred to in the key as 'Po218 tail fit'. It will be appreciated that the best-fit distribution curve 21 may also be expressed in the form $y=ae^{bx}+c$, where c=0.

The processor 3 is then configured at step 107 to calculate the area 29 under the curve 23 in the transuranic region of interest as shown in FIG. 3 bounded by the two indicated thresholds. The magnitude of the area 29 is representative of the total (predicted) count value for Po218. The processor 3 is also configured to determine the total recorded count value as represented by the area under the recorded distribution in the transuranic region of interest. This is the area which lies beneath the distribution curve 25 which is bounded by the upper and lower transuranic thresholds. The total recorded count value is the total of counts from Po218 and Am241.

Finally, at step 108 the processor 3 is configured to subtract the predicted count value from the determined count value within the region of interest and so calculate the count value solely related to the transuranic elements, Am241 in this case.

It will be appreciated that the following assumptions are made in the above embodiment. Firstly, alpha energy absorption in air increases as the energy of the alpha particle decreases. In theory, this is true, however, in practice the variance observed across a small air gap is deemed to be insignificant and therefore energy absorption is assumed to be constant in the energy range 5 to 9 MeV. Secondly, the probability distribution function of alpha particles emitted from $^{214}$Po is assumed to be the same function for $^{212}$Po and $^{218}$Po. The count rate varies according to the abundance of each of these isotopes and the ratio of $^{222}$Rn and $^{220}$Rn.

The above described embodiment advantageously provides an accurate, and therefore, reliable, determination of transuranic activity, unlike known methodologies. In contrast to known methodologies, which attempt to curve fit to a transuranic activity peak, the above described embodiment, deliberately does not attempt such a curve fit. Also unlike known methodologies there is no requirement to calibrate for each and every transuranic activity peak of interest. Furthermore, by selecting a particular region of interest one can have a single alpha channel which could be displayed on a display of the user input/output arrangement 9.

Figure 4:
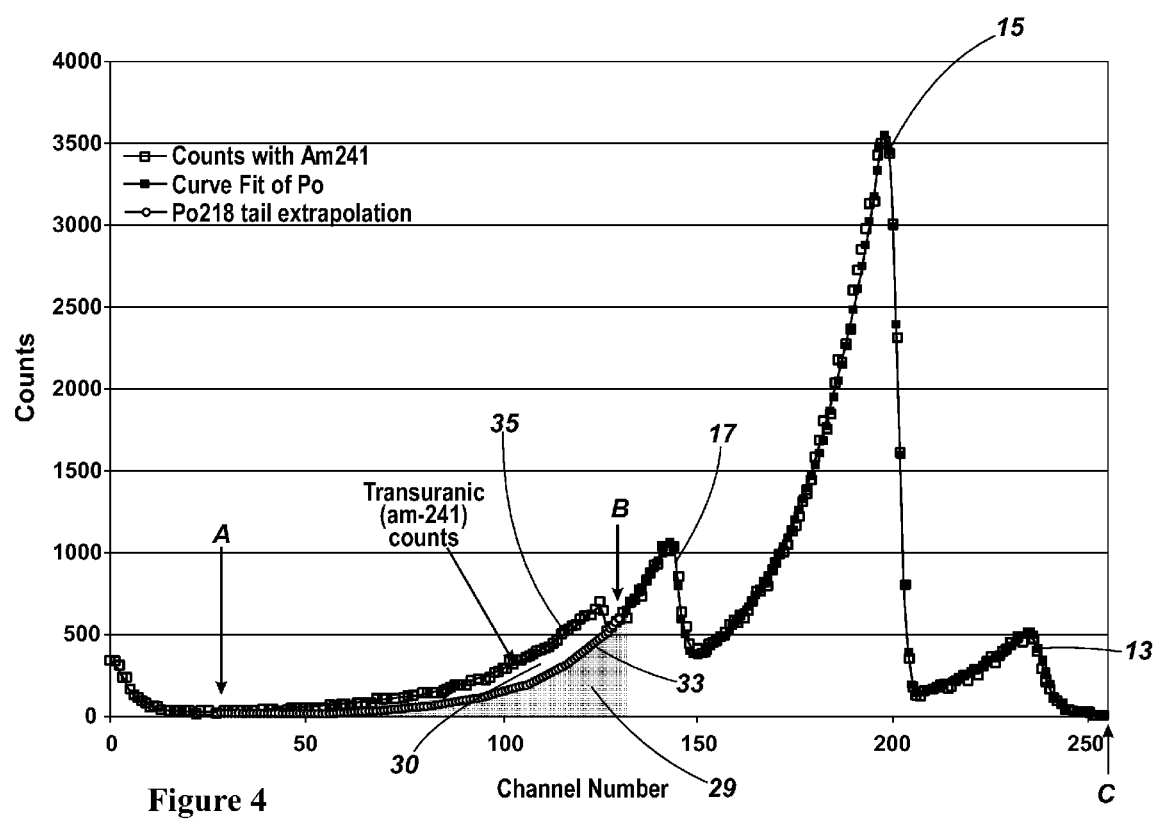
FIG. 4 shows a radioactivity energy spectrum.
Figure 5:
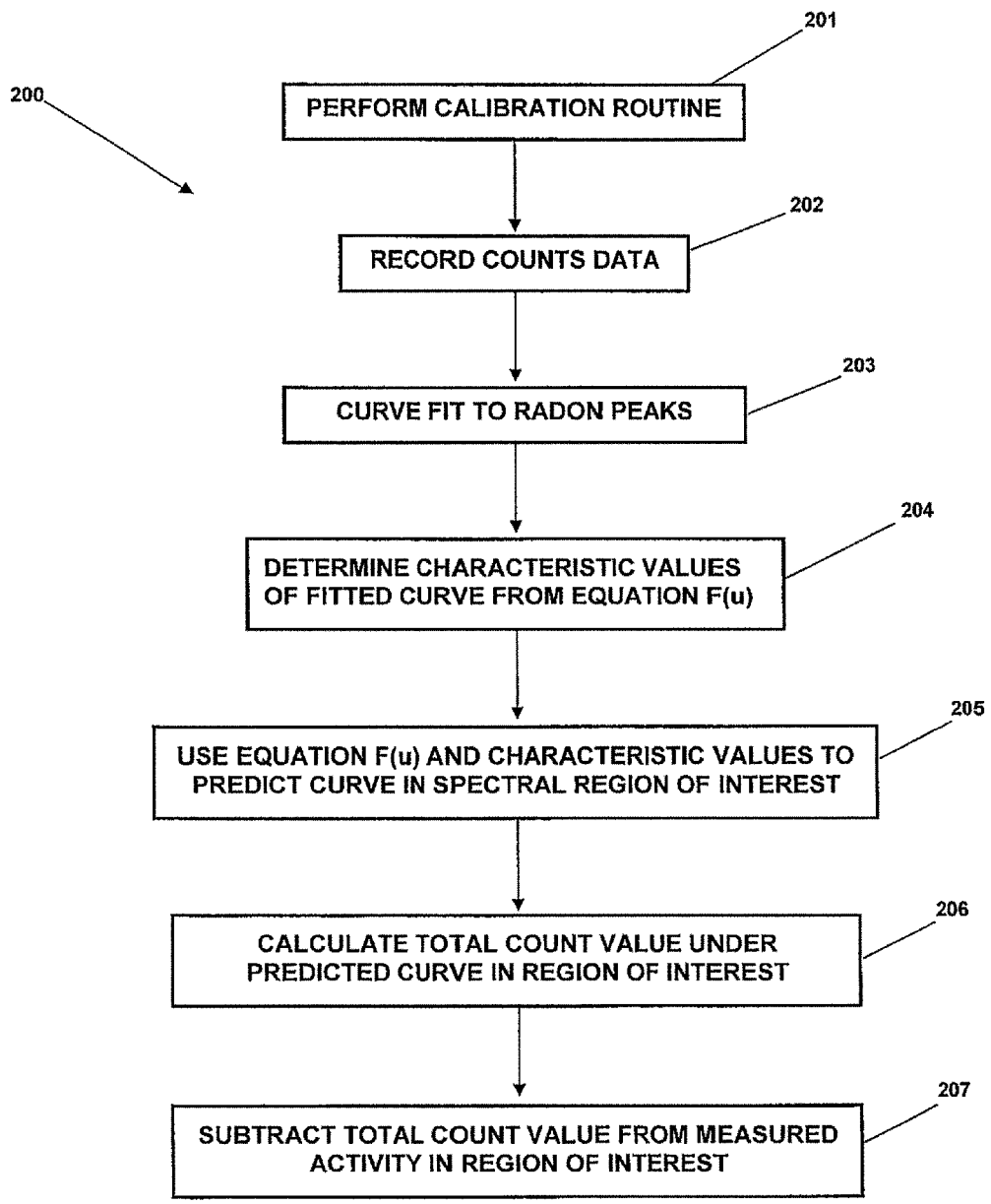
FIG. 5 shows a flow diagram.

Reference is now made to FIGS. 4 and 5 which relate to a second embodiment of the invention implemented by the radioactivity measuring apparatus 1.

A calibration routine, as shown at step 201 of the flow diagram 200 is first performed. During this routine, typically lasting several hours, radiation detected by the detector 5 is classified into respective channels, each channel relating to a particular detected energy level. As shown in FIG. 4 the peaks 13, 15 and 17 relate to Polonium activity which exists naturally in the form of Radon gas and specifically to $^{212}$Po, $^{214}$Po and $^{218}$Po, respectively. The peak 35 relates to transuranic activity. The recorded counts data is stored in the memory 11 (as shown at step 202).

At step 203 a suitable curve fit methodology, such as Marquardt-Levenberg non-linear regression, is used in accordance with instructions stored in the memory 11 by the processor 3 to obtain a curve fit of the spectral region starting from channel B up to channel C using the equation:

$$F(u) = \sum_{i=1}^{m} \frac{A_i}{k} \sum_{j=1}^{k} \left\{ \frac{n_j}{\tau_j} \exp\left[\frac{u-\mu_i}{\tau_i} + \frac{\sigma^2}{2\tau^2}\right] \mathrm{erfc}\left[\frac{1}{\sqrt{2}}\left(\frac{u-\mu_i}{\sigma} + \frac{\sigma}{\tau_j}\right)\right] \right\} \quad (1)$$

Where:
σ is the standard deviation of the Gaussian
τ is the tailing parameter
erfc is the complementary error function
m is the number of peaks
k is the number of exponentials needed (maximum of two are used)
$n_j$ is the fractional contribution of each
u is the energy variable
μ is the peak energy
F(u) is the counts value at a given energy
$A_i$ is a peak amplitude.

It will be appreciated that the peak positions (energies) are known before fitting but can be moved to give a best fit. The amplitude of the peaks is also fitted, but the energy variable, U, can have units of energy (e.g. eV, or KeV or MeV) or could be in channel numbers if uncalibrated. The number of peaks is pre-defined for the curve fitting procedure. The tailing parameter is not known and is fitted. The sigma value of the Gaussian defines the peak width and is a filled value.

Specifically, equation (1) is used to describe each of the peaks 13, 15 and 17 in the spectral region bounded by the channels B and C.

From the curve fit the processor 3, at step 204, determines the constant (characteristic) parameters of the equation (1) for the peaks 13, 15 and 17. At step 205 the equation (1) is then used again by the processor 3 in respect of each channel from channel A to channel B to determine the shape of the curve 33. Channel A corresponds to the lower alpha transuranic threshold and the channel B corresponds to the upper alpha transuranic threshold. At steps 206 and 207 the area under the curve 33 is then subtracted from the total area under the transuranic peak 35 by the processor 3. The resultant counts are shown by the area 30.

In the embodiment of FIGS. 4 and 5 only the activity from transuranic alphas are reported by the processor 3. Because the method fits the Radon progeny spectrum from above the maximum transuranic energy, the curve fit is not affected by any spectrum shape change caused by lower energy alphas. Also, because the extrapolated tail 33 of the Po-218 peak is calculated taking account of the curve fit of the peaks 13, 15 and 17 a good statistical certainty is obtained.

It will be appreciated that whilst the above embodiments relate to continuous air monitoring of Radon and transuranic alpha particles, other embodiments and implementations of the invention relate to other types of alpha counting in which activity peaks overlap.

In a variant of the embodiment of FIGS. 4 and 5 curve-fitting of equation (1) is applied only to the peaks 13 and 15 in order to obtain the required characteristic data.

What is claimed is:

1. A method of measuring radioactivity comprising determining a fitted spectral distribution region for recorded counts data of at least a first activity peak, determining characteristic data of the fitted spectral distribution region, and using the characteristic data to determine a spectral distribution region of a second activity peak, wherein the spectral distribution regions are both curves generally of the type $y=ae^{bx}$ where y=count value, x=energy channel value and a and b are coefficients.

2. A method as claimed in claim 1 in which the characteristic data comprises the coefficients a and b.

3. A method as claimed in claim 2 in which a value of the coefficient a for the second activity peak is determined by using the value of the coefficient b for the first activity peak and the equation $y=ae^{bx}$.

4. A method as claimed in claim 1 comprising determining a highest count value for each of the first and second activity peaks.

5. A method as claimed in claim 1 which comprises measuring Radon activity in a spectral region of interest.

6. A method as claimed in claim 1 in which the first activity peak is larger than the second activity peak.

7. A method as claimed in claim 1 in which the spectral distribution region of the second peak is positioned at a predetermined position relative to the first activity peak.

8. A method as claimed in claim 1 which is a method of determining transuranic radioactivity in a spectral region of interest.

9. A method of measuring radioactivity comprising determining a fitted spectral distribution region for recorded counts data of at least a first activity peak, determining characteristic data of the fitted spectral distribution region, using the characteristic data to determine a spectral distribution region of a second activity peak, determining a predicted count value of the spectral distribution region of the second activity peak in a spectral region of interest and subtracting said predicted value from a detected count value, which is the count value of detected activity in the spectral region of interest.

10. A method of measuring radioactivity comprising determining a fitted spectral distribution region for recorded counts data of at least a first activity peak, determining characteristic data of the fitted spectral distribution region, using the characteristic data to determine a spectral distribution region of a second activity peak, and determining the spectral distribution region of the second activity peak by extrapolating from the highest count value of the second activity peak.

11. A method of measuring radioactivity comprising determining a fitted spectral distribution region for recorded counts data of at least a first activity peak, determining characteristic data of the fitted spectral distribution region, using the characteristic data to determine a spectral distribution region of a second activity peak, curve fitting multiple activity peaks of recorded counts data using the equation:

$$F(u) = \sum_{i=1}^{m} \frac{A_i}{k} \sum_{j=1}^{k} \left\{ \frac{n_j}{\tau_j} \exp\left[\frac{u-\mu_i}{\tau_i} + \frac{\sigma^2}{2\tau^2}\right] \text{erfc}\left[\frac{1}{\sqrt{2}}\left(\frac{u-\mu_i}{\sigma} + \frac{\sigma}{\tau_j}\right)\right] \right\} \quad (1)$$

Where
$\sigma$ is the standard deviation of the Gaussian
$\tau$ is the tailing parameter
erfc is the complementary error function
m is the number of peaks
k is the number of exponentials needed (maximum of two are used)
$n_j$ is the fractional contribution of each
u is the energy variable
$\mu$ is the peak energy F(u) is the counts value at a given energy
F(u) is the counts value at a given energy
Ai is a peak amplitude,
and determining characteristic data from the curve fitting and using the characteristic data to determine the spectral distribution region of an activity peak of interest.

12. A method as claimed in claim 11 wherein the multiple activity peaks comprise peaks relating to Radon activity.

13. A method as claimed in claim 11 wherein the spectral distribution region of the activity peak of interest comprises a tail portion of an activity peak used during the curve fitting.

14. A radioactivity measurement apparatus comprising a data processor and a radioactivity detector, the data processor configured to determine a fitted spectral distribution region for recorded counts data of at least a first activity peak, determining characteristic data of the fitted spectral distribution, and using the characteristic data to determine a spectral distribution region of a second activity peak, wherein the spectral distribution regions are both curves generally of the type $y=ae^{bx}$ where y=count value, x=energy channel value and a and b are coefficients.

15. Machine-readable instructions for a data processor of a radioactivity measurement apparatus, the instructions embodied in a non-transitory machine-readable medium and causing the processor, when the instructions are loaded into a memory of the processor, to determine a fitted spectral distribution region for recorded counts data of at least a first activity peak, to determine characteristic data of the fitted spectral distribution region, and to use the characteristic data to determine a spectral distribution region of a second activity peak, wherein the spectral distribution regions are both curves generally of the type $y=ae^{bx}$ (where y=count value, x=energy channel value and a and b are coefficients.

* * * * *